J. T. CARROLL.
BEET HARVESTER.
APPLICATION FILED MAY 13, 1907.
922,084.
Patented May 18, 1909.
2 SHEETS—SHEET 1.
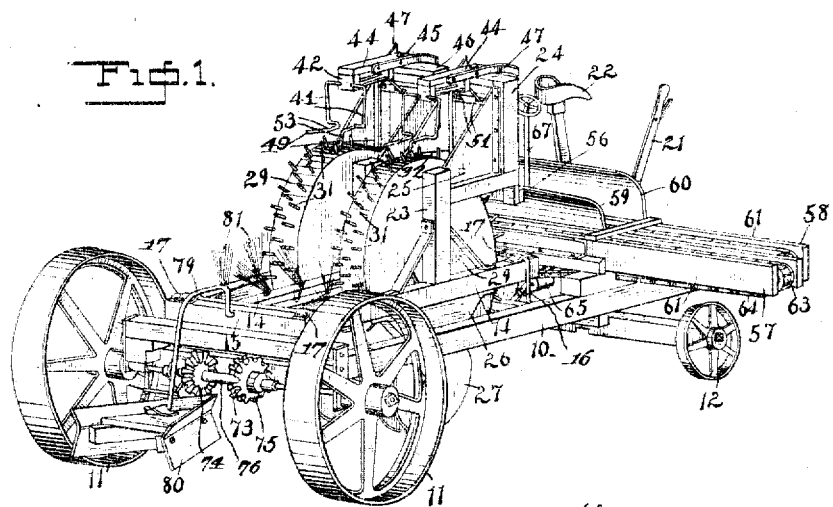
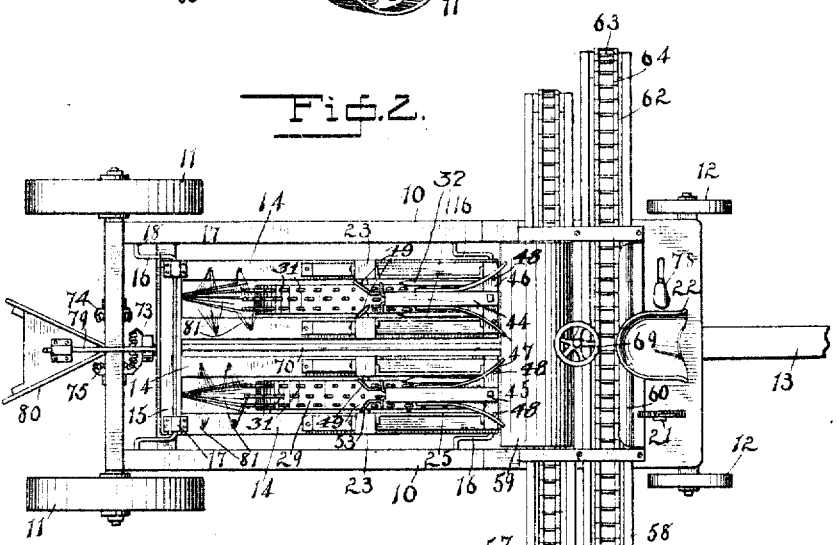
WITNESSES:
Mathew J Marty
C. F. Bassett
INVENTOR
James T. Carroll
By Frederick Benjamin
Atty.

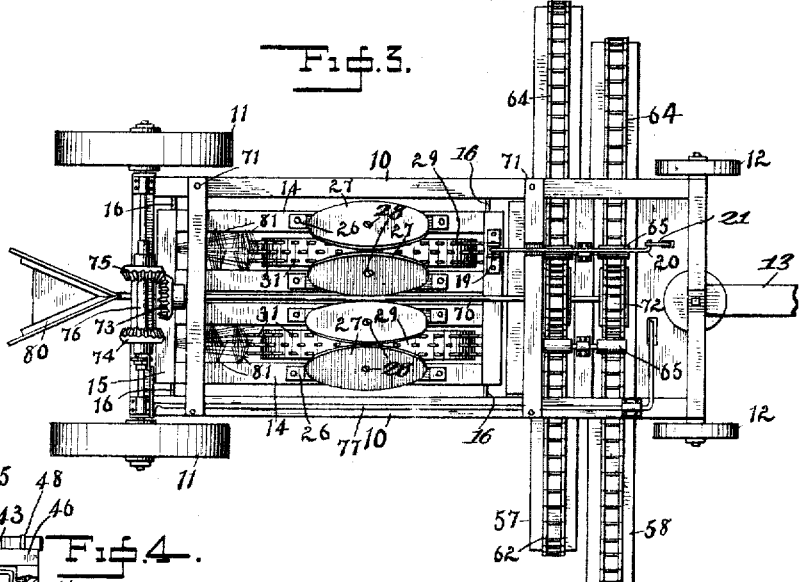

UNITED STATES PATENT OFFICE.

JAMES T. CARROLL, OF BILLINGS, MONTANA.

BEET-HARVESTER.

No. 922,084.    Specification of Letters Patent.    Patented May 18, 1909.

Application filed May 13, 1907. Serial No. 373,207.

*To all whom it may concern:*

Be it known that I, JAMES T. CARROLL, a citizen of the United States, residing at Billings, in the county of Yellowstone and State of Montana, have invented certain new and useful Improvements in Beet-Harvesters, of which the following is a specification.

My invention relates to agricultural implements and has special reference to that class of harvesting machines designed for the particular purpose of gathering beets.

Since the introduction of the beet sugar industry and the consequent large acreage devoted to beet culture many attempts have been made to facilitate the hitherto laborious work of gathering the roots and preparing them for the industrial process of producing sugar.
The machines in vogue at the present time and which represent the most advanced state of the art, however, have numerous defects and disadvantages which the apparatus hereinafter described is designed to eliminate.

The practice universally followed is to produce the roots in rows conveniently spaced to facilitate cultivation and the implements employed to harvest the crop take the form of plows, diggers, shovels and other similar mechanical contrivances which have so far proven unsatisfactory for various reasons although presenting a marked improvement over hand labor. One cause of trouble lies in the failure of certain classes of diggers to gather the smaller roots thus causing a considerable percentage of waste. Other machines do not complete the process of topping with sufficient accuracy and with non-adjustable knives some tops are cut too close to the root and others left too long. In other cases the digging implements have only one function so that auxiliary machines must be employed to complete the allied processes of cleaning and topping which materially increases the time and labor required to prepare the roots for the market.

In my improved beet harvester as hereinafter described the various mechanisms coact in such a manner that the different processes are carried out in the same machine and follow each other in close and proper sequence to attain the best results.
The chief objects of my invention are to provide a beet harvester that will be so efficient in its operation that the smaller roots will be gathered with as much certainty as those of larger size: to furnish a beet gatherer that will effectually remove the tops from the roots during the process of harvesting; to arrange coöperating mechanism in conjunction with the elevating process that will remove the adhering soil from the roots and leave them in the proper condition for the factory; and to provide means for separating the roots from the severed tops.

Other objects of my improvements are to produce a beet harvesting machine that will facilitate the gathering of the product by furnishing carriers for the separated tops and roots so arranged that they will be deposited in separate windrows parallel to the course of the machine across the field; to provide means for varying the distance between the deposited windrows and the machine; and to arrange the mechanism so that such deposits may be made upon either side of the machine as desired.

Further objects of my invention are to provide means for elevating the operative mechanism clear of the soil to permit of readily transporting the apparatus and to facilitate turning at the ends of the rows; to furnish mechanism for clearing the pick-up wheels of the severed tops and prevent them from becoming clogged therewith; to arrange shifting levers for throwing the carriers in and out of gear, and to furnish elevating appliances that will facilitate the deposit of the gathered and prepared roots in a cart or wagon driven parallel with the machine during its operation.

I accomplish the above and other minor results, generally speaking, by means of a main truck frame and an auxiliary frame to which is attached the principal operative mechanism, which consists of disk colters for loosening the soil, impaling mechanism for extracting the roots from the loosened earth, cutting knives for severing the tops, and carriers and elevators for distributing the roots and tops in separate locations.

The necessary mechanical construction for carrying out my improvements is fully illustrated in the accompanying drawings which form a part of this specification and in which:—

Figure 1 is a perspective view of my improved beet harvester with the auxiliary frame in its elevated position; Figs. 2 and 3 are top and bottom plan views, respectively; Fig. 4 is a front elevation of the brackets carrying the knife frame with attachments; Fig. 5 is a side elevation of one of the colters with support; Fig. 6 is a plan view of one of the knives; Fig. 7 is a perspective view of the swinging arm and adjusting fingers; Fig. 8 is a cross section taken between the conveyers and with the elevator attached to main frame. Fig. 9 is a view showing method of hanging pick-up wheels. Fig. 10 is a side elevation of the pick-up wheel and knife.

Referring to the drawings in detail, the numeral 10 indicates the side members of the main frame of the harvester supported on ground wheels 11, 12, the rear wheels 11 constituting the driving wheels for operating the carriers and elevator hereinafter described, and the front wheels 12 mounted upon an axle pivoted to the frame by a king bolt in the ordinary manner, to serve as guiding wheels, the said wheels being of small diameter so that they may pass under the main frame to enable short turns to be made at the ends of the rows. A tongue 13 is provided for the attachment of draft animals, although mechanical power such as a motor mounted upon the main frame and supplied with gearing connection with the driving wheels in the usual manner may be substituted therefor.

Within the main frame is located an auxiliary frame 14 rectangular in form and somewhat smaller than the frame 10 so that the former may have a vertical movement. Said auxiliary frame is composed of longitudinal members 14 connected by cross pieces 15, and is suspended from the main frame by crank shafts 16 journaled in bearings 17, 18, secured to the auxiliary frame and the main frame respectively.

Projecting vertically downward from the under side of the auxiliary frame is an arm 19 to which is secured one end of a link rod 20, the forward end being attached to an elevating lever 21 pivotally connected to the main frame, and located at a point convenient to the driver's seat 22. When the auxiliary frame is in its lower position traction made upon said link rod 20 by means of the lever 21 will cause said frame to be drawn forward and at the same time elevated by the rocking movement of the crank shafts 16, thus throwing the soil loosening implements hereinafter described, entirely free from the ground. Upon the auxiliary frame members 14 are stepped uprights 23 which support brackets 24 the latter being strengthened by triangular plates 25. The said brackets constitute a framework for supporting certain of the operating mechanisms to be set forth in detail hereinafter.

Fixed to the under side of each longitudinal member 14 of the auxiliary frame is a bracket 26 which carries a revoluble disk or colter 27, journaled on an arbor 28. The arbors of the alternate disks are inclined in opposite directions, so that the disks of each pair are set at an angle of about 45 degrees with a vertical plane. These disks are arranged to travel beneath the roots so that the beets in each row are included in the angle between each pair of said disks, and the latter sever the roots at a proper distance below the surface and at the same time serve to loosen the soil about the beets.

Arranged to revolve above each row of beets are the gathering or pick-up devices in the form of drums or wheels 29 which revolve on axles 30 journaled in slides 30ᵃ working in slots 23ᵃ in the uprights 23. The faces of these wheels are studded with pins or spikes 31 preferably arranged in rows in which the spikes are uniformly spaced as many of such rows being supplied as may be necessary to cover the face of the wheel. These wheels are designed to travel along the surface of the ground and the function of the spikes 31 is to impale the roots as they are loosened in the soil by the action of the cutting disks 27, pick them up as the wheel revolves and carry them over the wheel to the topping knives 32. The said pick up wheels as well as the cutting disks 27 are caused to revolve automatically by their contact with the ground as the machine is propelled over the field. Each of the pick-up wheels is furnished with one of the knives in the form of a plate having slots 33 corresponding in number with the rows of spikes in the wheel face thus splitting the knife plate into tines or blades 34, having pointed ends 35, the margins being beveled to form cutting edges 36. The blank edge of the plate is furnished with holes 37 for screws which secure the knife to a cross piece 38 of a knife frame, the lateral members 39 being received in vertical grooves 40 formed in the brackets 24 and having a limited movement therein. The pointed ends of the blades lie in close proximity to the face of the pick-up wheel but the position of the knives relative to said wheel face may be varied by means of adjusting arms 41. There are two of these arms for each wheel which pass through and are journaled in brackets or flanges 42, 43, which depend from a swinging arm 44 pivoted by a bolt 45 to a cross bar 46 supported by each pair of brackets 24. Said swinging arm 44 is yieldingly held in the median line of the wheel by plate springs 47 secured to the sides of said arm and engaging stops 48 fixed in the said cross bar 46. The rear ends of the arms 41 are bent outwardly, downwardly and rearwardly to form adjusting fingers 49 which have also a lateral inclination as illustrated. The forward ends of said arms are bent downwardly and then forwardly to form cranks 50 which engage slots 51 in the upper cross piece 52 of the sliding knife frame. The adjusting fingers 49 are close enough together at the bends 53 to prevent the smallest beet from being carried between them without being pressed apart and the extremities flare at a sufficient angle to take in the full width of the wheel 28. As the beets are carried over the wheel they will come in contact with the adjusting fingers and will force them apart thus revolving the arms 41 in their bearings and causing the cranks 50 to raise the knife frame so that the knives will cut the tops on a higher plane, thus removing more of the top when the roots are large. As soon as the top is severed the knife frame descends carrying the knife back to its initial position. The function of the swinging arm 44 is to insure an even movement of the crank arms 50 when a beet is impaled near the edge of the wheel. In such case if the arm 44 was rigid only one arm 50 would act upon the sliding knife frame and there would be a tendency to bind in the slide-ways. With the arrangement shown, however, the engagement of a root with one of the fingers will cause the arm 44 to swing over to that side, and thus equalizing the action of the said cranks, and adjusting the knife as before to the various sized roots. In order to insure a quick return of the knife to its initial position the cranks 50 are connected by a spring 54. The knives are preferably placed with the beveled edge down and the sharp points enable them to enter with greater facility the shape of the points also preventing interference with the spikes should there be any lost motion laterally.

Below the knives are located wheel cleaners 55 one for each wheel secured to the lower tie piece 56 of the knife frame support. These cleaners or scrapers are similar in shape to the knives but have no adjustability, being fixed rigidly to said tie piece, so that the points ride against the face of the wheel, and clear the spikes of the tops after they have been severed by the said knives.

Just forward of the topping device are located duplicate conveyers 57, 58, designed to carry the separated tops and beets laterally to either side of the machine as may be desired. The rear conveyer 57 is designed for the tops which fall from the cleaners 55 directly thereon, and the beets after being severed drop upon a curved shield or apron 59 which deflects them upon the forward conveyer 58, a fender 60 preventing their being thrown over said conveyer. Each conveyer frame is composed of side boards 61 joined by a floor plate 62. At each end are located rollers 63 over which pass endless link belt chains 64 to form the carriers said chains being kept from sagging so as to interfere with the frame work by idlers 65. The side boards 61 rest upon the main frame and are free to be adjusted longitudinally with reference to each other and to the main frame by a pinion 66, keyed to a vertical shaft 67 and meshing with a rack 68 fixed to the lower edge of the opposing side pieces of the respective conveyers. The said shaft 67 is supplied with a hand wheel 69 by means of which the conveyer can be shifted simultaneously in opposite directions.

Located in the median line beneath the main frame is a shaft 70 journaled in frame tie members 71, and provided with sprocket wheels 72, one of which is located beneath the floor of each conveyer and around which passes the slack of the chain 64. Upon the rear end of the shaft 70 is mounted a beveled gear 73 which is adapted to mesh with similar gears 74, 75, fixed to a sleeve 76, which is keyed upon the axle of the driving wheels 11 so as to turn therewith but is adapted to slide longitudinally to alternately engage the pinions with the gear 73 in the manner common in the art. The shifting of this sleeve is controlled by a rod 77 which passes under the main frame and is furnished with an operating handle 78 placed at the left of the driver's seat.

At the rear of the operating frame and attached thereto by a supporting rod 79 is a leveling plow 80, which is designed to run just beneath the surface of the ground to make a clean and level path for the windrow of beets. The rod 79 is bent to avoid interference with the main frame when the inner frame is lowered and as the plow 80 is attached to this frame it will be raised from the ground or put in action simultaneously with the digging mechanism.

In addition to the cleaners 55, stiff brushes 81, preferably formed of steel wire, are permanently fixed in the frame members 14, and are arranged at various angles so that they will be adapted to engage the beets as they are elevated upon the impaling spikes and thus effectually remove any adhering soil.

It will be observed that when the auxiliary frame is lowered to its operative position it rests upon the tie pieces 71 and that this bodily movement of the said frame has no action upon the gears 73, 74, and 75, which may remain in mesh when the other mechanism is in inoperative position. The conveyers may be put out of operation however by placing the controlling lever in its middle position.

Instead of dropping the beets in rows along the ground the gathered roots may be placed directly into a wagon driven alongside the machine by means of the elevating device illustrated in Fig. 8. The forward conveyer 58 is fitted with a sprocket wheel 82 which is fixed to the projecting end of the shaft of one of the rollers 63. An elevator 83 is secured at the lower end to the main frame, and is supported by a framework 84. The elevator is furnished with a link belt chain 85, which is actuated by a sprocket 86 connected to the sprocket 82 by a chain 87.

The operation of the machine is as follows:—The auxiliary frame having been lowered to its operative position, a forward movement of the apparatus will cause the circular disks to enter the ground upon each side of a row of beets. The pick-up wheels will impale the loosened roots and carry them over the top of the wheel until they meet the knives where the tops are severed and the roots and tops fall into their separate conveyers. If the pinion 73 is in mesh with the right hand gear 74, the conveyer chains will carry the beets and tops to the right hand side of the machine and if the elevator is in position the beets will be carried thereby and deposited in the accompanying wagon. If desired the elevator may be removed and the beets deposited in rows along the ground. The conveyers may be adjusted laterally by the hand wheel 69, and they are so related that their ends will project at different distances from the machine, thus depositing their load in separate rows. Upon the return trip the conveyers are thrust laterally from the opposite side of the frame and so adjusted that the roots and tops will fall upon the rows previously deposited. This arrangement will permit at least five rows to be placed in a single windrow after being harvested, thus facilitating their removal.

Beets vary greatly in size and so project at different heights above the ground surface. For this reason the pick up wheels and their attachments are free to reciprocate vertically in the uprights 23 as hereinbefore described and thus adjust themselves to the unevenness of the roots.

It is obvious that many changes may be made in the devices of my invention as herein disclosed without departing from the spirit and scope thereof and I do not wish, therefore, to be limited to the precise construction set forth.

Having thus described my invention what I claim as new, is:—

1. In a beet harvester, the combination with the frame, of rotary disks adapted to loosen the soil about the roots, extracting means consisting of a wheel provided with radial spikes, and means for automatically moving said wheel vertically.

2. In a beet harvester, the combination with the frame, of rotary disks adapted to loosen the soil about the roots, extracting means consisting of a plurality of wheels provided with radiating spikes, means for automatically moving said wheel vertically, and a conveyer for the extracted roots.

3. In a beet harvester, the combination with the frame of rotary disks inclined at an angle with the vertical plane, said disks being adapted to loosen the soil adjacent to the roots, extracting wheels adapted to be moved vertically, a series of spikes radiating from the faces of said wheels, means for removing the roots from said spikes.

4. In a beet harvester, the combination with the frame, of rotary disks, having their planes inclined at an angle with the vertical plane, said disks being adapted to pass beneath the row of beets, extracting wheels adapted to be moved vertically, a series of impaling spikes radiating from the faces of said wheels, a conveyer for depositing the roots at a distance from the path of the extracting wheels, and means for adjusting said conveyer.

5. A beet harvester, including rotary cutters for loosening the soil, and means for extracting and elevating the beet roots, said means consisting of a wheel revolubly mounted upon a horizontal shaft and provided with a plurality of points projecting radially from the face of said wheel.

6. A beet harvester, including means for loosening the soil about the beet roots, said means consisting of revoluble circular colters arranged in pairs and having their planes inclined at opposite angles with a vertical plane and extracting means consisting of impaling wheels.

7. In a beet harvester, the combination with the main frame, of an auxiliary frame, crank shafts supporting said auxiliary frame, revoluble disks adapted to loosen the beets in the ground, extracting means consisting of impaling wheels, and means for automatically raising and lowering said wheels.

8. In a beet harvester, the combination with the main frame, of an auxiliary frame supported upon crank shafts, revoluble disks having an angular position relatively to the vertical plane, said disks adapted to pass beneath the beet rows, extracting wheels having impaling means for engaging and elevating the roots, and means for removing the roots from said impaling means.

9. In a beet harvester, the combination with the main frame, of an auxiliary frame supported upon crank shafts, revoluble cutting disks having inclined axes, and adapted to pass beneath the rows of beets, extracting means consisting of revoluble drums having their faces studded with radiating impaling spikes, means for removing the engaged beets from the impaling spikes, and a conveyer for depositing the roots out of the path of said extracting means.

10. In a beet harvester, the combination with the frame, of an elevating device for the beet roots, said device consisting of a wheel mounted upon a horizontal shaft, and having points projecting radially from its face.

11. In a beet harvester, the combination with the frame, of means for loosening the soil about the plant roots, said means consisting of a pair of revoluble disks, arranged with their planes inclined at opposite angles with the vertical plane, means for raising and lowering said disks relatively to the said frame and extracting means consisting of impaling wheels.

12. In a beet harvester, the combination with the main frame, of an auxiliary frame adapted to be moved vertically, means for raising and lowering said auxiliary frame, a series of colters for loosening the beets in the rows, extracting wheels revolubly mounted on a sliding frame carried by said auxiliary frame, and means for removing the beets from the extracting wheels.

13. In a beet harvester, the combination with the main frame, of an auxiliary frame adapted to be moved vertically, manually operated means for raising and lowering said auxiliary frame, a series of revoluble colters for loosening the roots, said colters consisting of cutting disks arranged to coöperate in pairs, and inclined so that their cutting edges are approximated below the beet row during the operation of the machine, and means for extracting the loosened roots, said means consisting of impaling wheels.

14. In a beet harvester, the combination with the main frame, of an auxiliary movable frame manually operated means for controlling the position of said auxiliary frame, cutting disks carried on said auxiliary frame, said disks being adapted to pass beneath the beets to sever the top and side roots and loosen the soil, extracting wheels having radiating spikes adapted to impale the loosened beets, means for automatically raising and lowering said extracting wheels, and means for removing the impaled beets from the wheels.

15. In a beet harvester, the combination with the main frame, of an auxiliary movable frame, manually operated means for adjusting the height of said movable frame, inclined cutting disks carried on said movable frame and adapted to loosen the soil and sever the rootlets of the beets, extracting wheels mounted upon separate axles journaled in a sliding frame, said wheels having impaling pins projecting radially from their faces, and means for removing the adhering soil from the extracted roots.

16. In a beet harvester, the combination with the main frame, of an auxiliary movable frame, crank shafts connecting the movable frame with the main frame, means for manually adjusting the position of the movable frame, inclined cutting disks having their edges approximated at an angle with each other and adapted to cut the top roots and loosen the soil about the beets, impaling wheels mounted upon separate axles, said axles being journaled in sliding supports carried by the said auxiliary frame, the brushes arranged to engage the extracted beets while carried by the wheels, means for removing the beets from the impaling wheels, a conveyer for depositing the beets out of the path of said wheels, and means for leveling the ground to receive the deposited roots.

17. In a beet harvester, the combination with a main frame, of extracting and elevating devices consisting of a plurality of wheels mounted to revolve on separate horizontal shafts and provided with pins projecting radially from their faces.

18. In a beet harvester the combination with a main frame, of an extracting and elevating device consisting of a wheel journaled in a slidable frame, said wheel having spikes projecting radially from its face.

In testimony whereof I affix my signature in the presence of two witnesses.

JAMES T. CARROLL.

Witnesses:
C. E. STEELE,
JAMES CARROLL.